May 22, 1962  E. UHLMANN  3,036,257
PROTECTIVE ARRANGEMENT FOR HIGH VOLTAGE DIRECT
CURRENT POWER TRANSMISSION
Filed June 30, 1958  2 Sheets-Sheet 1
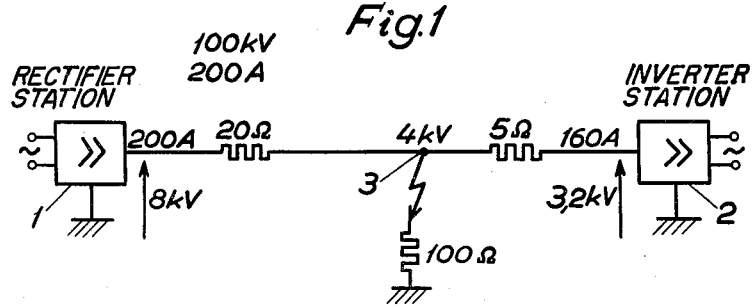
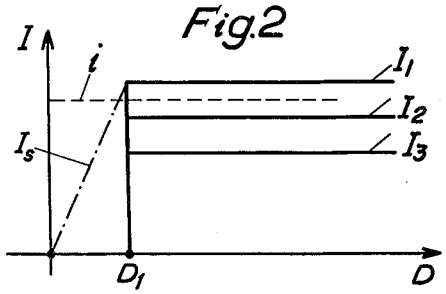
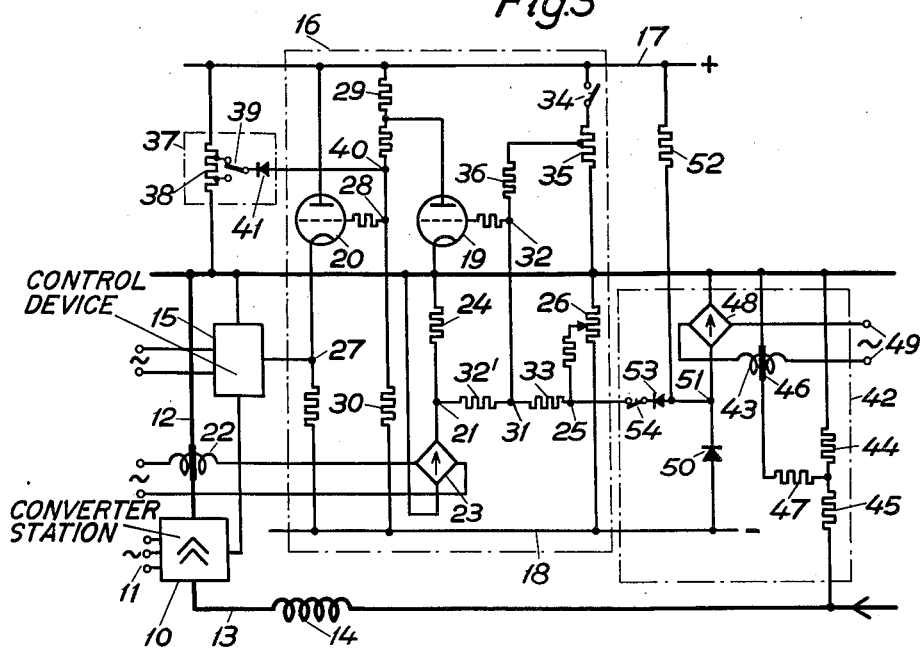
Inventor
Erich Uhlmann
By [signature]
Attorney May 22, 1962   E. UHLMANN   3,036,257
PROTECTIVE ARRANGEMENT FOR HIGH VOLTAGE DIRECT
CURRENT POWER TRANSMISSION
Filed June 30, 1958   2 Sheets-Sheet 2
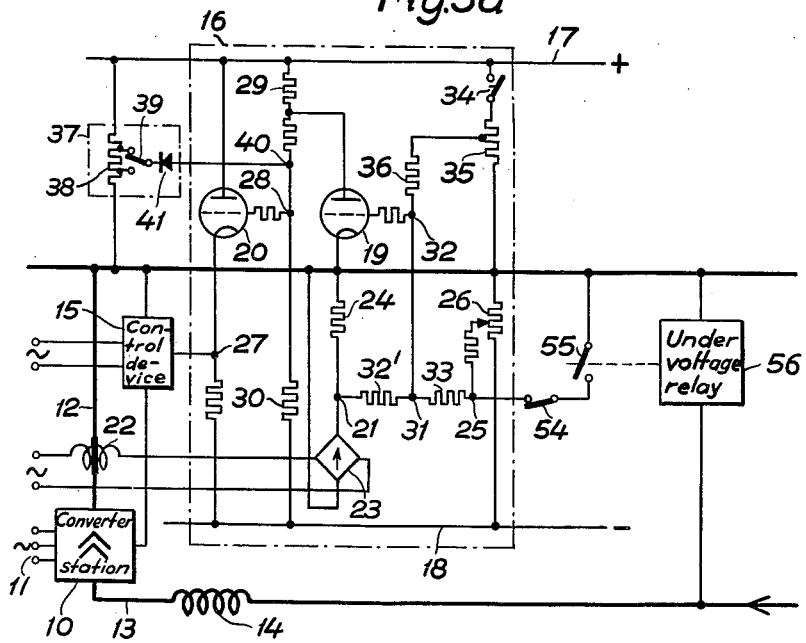
ERICH UHLMANN
INVENTOR.
BY Bailey Stephens and Huettig
Attorneys

3,036,257
PROTECTIVE ARRANGEMENT FOR HIGH VOLTAGE DIRECT CURRENT POWER TRANSMISSION

Erich Uhlmann, Ludvika, Sweden, assignor to Allmanna Svenska Elektriska Aktiebolaget, Vasteras, Sweden, a corporation of Sweden
Filed June 30, 1958, Ser. No. 745,670
Claims priority, application Sweden June 29, 1957
4 Claims. (Cl. 321—2)

The present invention refers to a protective arrangement for a high voltage direct current power transmission, connecting two A.C. networks by means of two converter stations connected by a D.C. transmission line, one of said converter stations operating as a rectifier, the other operating as an inverter. The invention particularly refers to such plants where the static converter in the inverter station of the transmission system comprises a regulator which does not function during normal operation and which is provided with blocking means preventing the transition of the station to rectification, and where the static converter in the station, functioning as a rectifying station, is provided with control means of a kind known per se for continuous control of the E.M.F. of the rectifier station between a positive and a negative value, that is, continuous conrol from recifier to inverter operation and actuated by a regulator normally used for controlling the station in response to an operating quantity such as current, power, frequency etc., in which case the control means is so designed that it enables transition from rectification to inversion.

Normally, the converter stations are so controlled that the direct current from the rectifier station maintains a set value and the current control of the inverter station is idle as long as the direct current is larger than the current set in the regulator of the inverter station. This current setting is usually chosen to be a certain amount lower (marginal current) than the setting in the rectifier station. In a direct current transmission system controlled in this way, the current tapped at a fault location on the line can never be larger than the said margin. If the current from the fault location should tend to become larger, the inverter would receive a smaller current than the set value, which would involve a decrease in voltage. In this case the rectifier would also decrease its voltage in order to prevent the current exceeding its set value. Both stations are so controlled that their voltage is greatly reduced and consequently the line voltage is also reduced. A stable value will be obtained when the voltage at the fault location reaches a value which is determined by the margin current times the earth resistance. For moderate values of the earth resistance the voltage at the fault location will consequently be very low and so will the voltage at both the converter stations.

The characterising feature of the invention is that the rectifier station, in order to enable the extinction of any flash-over that may appear on the line or on apparatus connected to it, is provided with a device sensitive to the output of the D.C. voltage of the rectifier and arranged to function when said output voltage is lower than a pre-determined value and arranged to rapidly decrease the rectifier voltage to zero voltage or a negative value (inverter operation), in order to rapidly bring the current of the station to zero.

If flash-over occurs on an insulator chain or if a protective arc-gap functions, the residual current cannot be extinguished without certain steps being taken owing to the lack of zero passage for the current. In order to illustrate how a fault of the type mentioned influences a direct current transmission, reference is made to FIGURE 1 showing diagrammatically a supposed transmission system connecting two A.C. networks by means of a rectifier station and an inverter station, said two stations being connected via the earth and partly via a D.C. conductor, said D.C. conductor being impaired upon a line fault. In the figure, 1 designates a rectifier station, on the one hand being connected to a source of alternating current and on the other hand feeding a direct current transmission line, one pole of which is grounded. At the opposite end of the line an inverter station 2 is connected in a corresponding way. It is assumed that the transmission is designed for 100 kv. and operates with 200 a. The current setting at the rectifier station is then 200 a. and at the inverter station it may be 160 a. Thus the current in the inverter station cannot become lower than 160 a. and the current in the rectifier station cannot be higher than 200 a. At a fault location the highest possible current will then be 40 a. Assuming there is a fault at point 3 of the line, causing ground contact and having an earth resistance of 100 ohms a voltage drop of 4 kv. will appear across the fault location. It is further assumed that the line resistance for the part between the station 1 and the point 3 is 20 ohms and that the line resistance for the remaining part is 5 ohms. A voltage 4+4=8 kv. to ground, will then be measured at the rectifier station and a voltage 4—0.8=3.2 kv. at the inverter station. If no special precautions are taken the rectifier station will supply 200 a. of the voltage 8 kv. and the inverter station will receive 160 a. of the voltage 3.2 kv. and the current 40 a. will flow through the fault location.

In known transmission systems it has been possible to eliminate the residual current at the fault location by disconnecting the rectifier station by means of circuit breakers or by blocking the valve groups in said station. However, none of these measures allow the rectifier station to be transferred to inverter operation. Usually rapid reclosing of the circuit breakers is performed at the stations and the reclosing time is dependent on the functional time of relay protection and of deionization in the fault location. These drawbacks are eliminated by the invention, according to which the regulator of the rectifier station is controlled in such a way that both current and voltage of this station are brought to zero. The current of the station, however, cannot momentaneously become zero owing to dynamic conditions and above all owing to the energy which is stored in the reactors of the system. According to the invention the regulator of the rectifier station obtains a new setting value if the voltage of the transmission system falls below a limit value. This setting value is so arranged that it demands that the current of the rectifier station becomes zero. In order to satisfy this demand the rectifier station must have the opportunity of being transferred to inverter operation. In order to attain this, the invention is applied for power transmission systems comprising converters for continuous control between rectifier and inverter operation.

If current and voltage have become zero, a static condition has been reached out of which the transmission system cannot be brought without external measures. To start the system, current is required for charging the capacitors of the system but the regulator of the rectifier station would not allow current to be supplied if voltage does not exist.

The influence of the new setting quantity on the regulator of the rectifier station is suitably obtained according to the invention, by changing the characteristic current setting of the station, if the voltage falls below the said limit value, to become voltage dependent.

In the accompanying drawing, FIGURE 2 shows a current voltage diagram of a transmission system according to the invention.

FIGURE 3 shows a form according to the invention.

FIGURE 3a shows a modification thereof.

FIGURE 2 shows a diagram of current I and voltage D. The characteristic current setting of the rectifier station is shown in full-drawn lines. Above a limit voltage $D_1$ the characteristic curve is represented by horizontal lines $I_1$, $I_2$ and $I_3$ for different current settings. At the limit value $D_1$ the characteristic curve is changed and in the figure the case is shown that it becomes voltage dependent and rapidly falls to the point $D_1$. It is also possible, however, that the current obtains zero value for a voltage value lying between the limit value $D_1$ and a lower value which will in any case be larger than zero. In the figure the current setting of the inverter station corresponding to the current $I_1$ of the rectifier station, is shown by the dashed line "$i$" which is lower than the current $I_1$ and differs from it by the margin value.

In order to be able to start a transmission system of the described type it is necessary to replace the voltage dependent characteristic, giving the current zero for a finite voltage value, by a characteristic cutting the I-axis at zero according to the chain line $I_s$ in FIGURE 2 or cutting the I-axis at a positive current value.

FIGURE 3 shows diagrammatically a form of the invention applied to a converter station, in this case in rectifier operation. In the figure, 10 denotes a converter station in rectifier operation which is connected to a source of alternating current at the terminals 11, and which has two direct current conductors 12 and 13. A direct current reactor 14 is connected in circuit with the conductor 13. The rectifier 10 has a control device 15 of a kind known per se and the control device is influenced by a regulator 16 framed by a chain line in the figure. The control device 15 could, for instance, be made as shown in Rissik, 1935, Mercury Arc Current Converters, page 156, FIG. 66. The grid control voltage comprises here a fixed A.C. voltage forming a reference voltage in series with a variable A.C. voltage forming a biasing control voltage, so that the greatest value of said biasing voltage corresponds to a positive E.M.F. of the converter, that is, rectifier operation, while the lowest value corresponds to a negative E.M.F. of the converter, that is, inverter operation. The biasing D.C. voltage is then suitable taken from the point 27, if necessary via an amplifier. An auxiliary voltage is supplied to the regulator from a plus-conductor 17 and a minus-conductor 18. The regulator comprises two thermionic tubes 19 and 20 for the amplification of control impulses. The operational quantity of the power transmission system used as a reference quantity to the regulator is in this case chosen as the rectifier current and a quantity corresponding to this current is supplied to the point 21. In the figure, one method of performing this is shown. The direct current of the station magnetizes a transductor 22 the alternating current of which is rectified in the rectifier 23, the direct current output of which is connected to the point 21. A resistor 24 is connected between the plus conductor 12 and the point 21 and a voltage proportional to the direct current of the station will be obtained across said resistor. In the regulator this voltage is compared with a voltage, proportional to the current to be set, obtained between the plus conductor 12 and the point 25. The value of said voltage may be changed by varying a potentiometer 26 connected between the plus conductor 12 and the minus conductor 18. The control device 15 acts on the converter 10 in a way that the direct current of the station increases if the current from the thermionic tube 20 increases. In order that the latter current shall increase, the potential in the point 28, connected to the grid of the tube 20, must also increase. The potential in the point 28 on the other hand, is able to increase if the voltage across the resistor 29 decreases, which is part of the voltage divider, consisting of this resistor 29 and a resistor 30 connected between the auxiliary voltage conductors 17 and 18. This will occur when the current through the valve 19 decreases. The sensing quantity obtained from the rectifier 23 will make the potential in the point 21 more positive if the direct current from the station increases. The potential in the point 31 which is connected to the points 21 and 25 respectively, via the resistors 32' and 33, will then also become more positive. Consequently the point 32, which on the one hand is connected to the point 31 and on the other to the grid of the thermionic tube 19, will become more positive. The current through the valve 19 will thus increase, involving that the control device 15 will choke the rectifier 10 and thus decrease its direct current.

It is evident that if only the influence of a value set at the potentiometer 26 is regarded, owing to the chosen connection, the point 21 will always obtain negative potential. The points 31 and 32 will then also obtain negative potential and the current through the thermionic tube 19 will get a tendency to decrease. Therefore, according to the above the direct current from the rectifier 10 will increase.

If both the said control systems are in action together, they tend to adjust the direct current of the station to such a value that a balance is reached between the set quantity obtained from the potentiometer 26 and the sensing quantity obtained from the transductor 22. This result can only be reached if the potential in the point 31 is mainly zero.

FIGURE 3 also shows means for adjusting the marginal current. For this purpose a control switch 34 is provided. This switch should be open when the converter operates as a rectifier station and closed when the converter operates as an inverter station. The switch is connected in series with a resistor 35 between the plus conductor 17 of the auxiliary voltage and the plus conductor 12 of the station. A tapping on the resistor 35 is connected with the point 32 via a further resistor 36. During inverter operation a fixed positive potential will thus always be impressed on the point 32 which means that in order to obtain the balance condition, the direct current from the rectifier 23 has only to reach a lower value than in rectifier operation when the control switch 34 is open.

In addition, FIGURE 3 shows the blocking means 37 which, according to the invention, prevents a converter operating as an inverter station from being transferred to rectification. The blocking means comprises a resistor 38 provided with two tappings to which a change-over switch 39 may alternatively connect the point 40. The upper tapping is used in rectifier operation and the lower in inverter operation. The resistor 38 is connected between the plus conductor 17 of the auxiliary voltage and the plus conductor 12 of the station. Between the change-over switch and the point 40 a current valve 41 is connected in the shown way. The potential in the point 40 and thus in the point 28 cannot, owing to the current valve 41, become more positive than the voltage determined by the resistor 38. In this way the control device 15 can never give a larger control quantity to the converter 10 than determined by the potential obtained from one of the two tappings on the resistor 38. The lower tapping used for inverter operation is so chosen that the regulation can under no circumstances be brought to rectification.

In the form of the invention shown in FIGURE 3, a voltage sensing member 42 is arranged. This member comprises a transductor 43 excited by a control quantity proportional to the line voltage and obtained by means of a voltage divider consisting of the resistors 44 and 45 connected between the main conductors 12 and 13. The excitation winding 46 of the transductor 43 is connected across the resistor 44 in series with a resistor 47. The power winding of the transductor 43 is connected to a source of alternating current at the terminals 49 in series with a rectifier 48. The positive pole of the rectifier 48 is connected to the plus conductor of the station and the negative pole is connected to the auxiliary voltage minus conductor 18 in series with a current valve 50, the current direction of which corresponds to that of the rectifier 48. A point 51 between the current valve 50 and the rectifier 48 is, on the one hand connected via a resistor 52 to the auxiliary voltage plus conductor 17, and on the other hand via a current valve 53 and a switch 54 to the point 25 in the regulator 16.

It is presumed that in the form illustrated in FIGURE 3, the plus conductor 12 of the station serves as the neutral conductor in a system comprising two converters 10. It is also possible to refer the auxiliary voltage system 17, 18 to the said neutral conductor and a current flowing through the resistor 52 from the conductor 17 will pass the point 51 via the rectifier 48. As this rectifier is also influenced by the current from the transductor 43 the potential at the point 51 will be dependent on the largest of said currents.

If the converter 10 supplies no voltage the transductor 43 will give no current to the rectifier 48 and the current through the resistor 52 from the conductor 17 will short-circuit the current valves in the rectifier 48. This involves the point 51 obtaining the same potential as the conductor 12 serving as neutral conductor, i.e. said potential will become zero. If the voltage between the conductors 12 and 13 grows from zero, the potential in the point 51 will remain zero as long as the current through the resistor 52 is larger than the current from the transductor 43. When the transductor current dominates, this current will also have to pass the resistor 52 and then the short-circuit of the current valves in the rectifier 48 ceases and the potential at the point 51 is decreased towards the negative potential of the conductor 18. When the direct voltage of the station increases, the point 51 will become more negative. In order that the current valves in the rectifier 48 should not have to be dimensioned for too high negative voltages, the valve 50 is connected in such a way that the potential at the point 51 is limited.

By connecting the points 51 and 25 the regulator 16 can be influenced by the voltage sensing member 42. According to the above description the regulator is so arranged that balance is obtained when the point 25 has a negative potential. As long as the voltage sensing member 42 keeps the potential in the point 51 sufficiently negative the member 42 will not influence the regulator. The current valve 53 prevents current flowing from the point 25 to the point 51. If a fault, of the type mentioned above, occurs on a line operating at full tension, the line voltage will rapidly sink according to the description with regard to FIGURES 1 and 2. At a certain voltage value the potential at the point 51 will rapidly increase to zero. This means that the potential at the point 25 will become more positive and the regulator will decrease the output current of the rectifier station. The control impulse of the regulator will influence the control device 15 until the current of the station has been decreased to zero and this results in the control device momentarily transferring the rectifier station to inversion.

As mentioned earlier in the description, a station according to the invention cannot start without special measures being taken. These measures are that the voltage dependent characteristic according to the full-drawn lines in FIGURE 2, is replaced by a characteristic which, for example, passes zero according to the chain line. This is made possible in the form shown in FIGURE 3, by breaking the switch 54. This switch usually consists of a relay contact. The characteristic of the inverter station must be so arranged that it is below the characteristic of the rectifier station. Those means in the inverter station, which are necessary for this purpose, are not shown in FIGURE 3 but are similar to those shown in this figure.

It is a special advantage, from the operational point of view, that an automatic decrease of current and voltage to zero, is obtained without any mechanical element having to be put into action and that such an element is only required when the station is to be started. The switch used for this purpose can also, in a simple way, be actuated by an automatic member in a rapid reclosing device. As the protective device is able to function without relays, it is not necessary to pay regard to the functional time of such relays. It will be clear that the current through a fault location can only become a fraction of the rated current so that the de-ionizing time for the arc at the fault location will become considerably shorter than in transmission systems known before. For this reason the time until reclosing can occur will become considerably shorter than in former transmission systems.

In the form of the invention shown in FIGURE 3, a voltage dependent member 43 is shown, which only contains static elements. In this way the drawbacks which may arise when using relays which usually have too long a function time, are avoided, or when using thermionic tubes which are too fragile. The use of such elements, however, falls within the scope of the invention and every connecting device known per se, having knee curve character, can be used. By way of example, the device 42 can as shown in FIGURE 3a be replaced by an under voltage relay 56 which, when the D.C. output voltage of the rectifier falls below a predetermined value operates a switch 55 to connect the point 25 directly to the central conductor 12.

I claim as my invention:

1. In a high voltage direct current power transmission system for transmission of power from one A.C. network to another through a rectifier station, a D.C. transmission line and an inverter station; said rectifier station having control means for normally controlling the station in response to a constant operational quantity of the power transmission system, said control means being of the type providing continuous control of the E.M.F. of the rectifier between a positive and a negative value, a protective arrangement comprising means responsive to the D.C. output voltage of said rectifier station and connected to said control means, said protective arrangement operating said control means when said D.C. output voltage of said rectifier station falls below a predetermined value in such a way that the E.M.F. of said rectifier is rapidly decreased to a value between zero and a negative value.

2. In a system as claimed in claim 1, blocking means in the inverter station for preventing the inverter station from being transferred to rectifier operation.

3. In a system as claimed in claim 1, said means responsive to the D.C. output voltage of said rectifier station being a relay.

4. In a system as claimed in claim 1, said means responsive to the D.C. output voltage of said rectifier station being a static change-over device adapted for knee-curve regulation.

References Cited in the file of this patent

UNITED STATES PATENTS

| | | |
|---|---|---|
| 2,648,460 | Busemann | July 20, 1954 |
| 2,833,977 | Levy et al. | May 6, 1958 |
| 2,866,148 | Forssell | Dec. 23, 1958 |